United States Patent
Murase et al.

[11] Patent Number: 6,120,227
[45] Date of Patent: Sep. 19, 2000

[54] SELF-ALIGNING BOLT

[75] Inventors: Yoshihiro Murase; Yoshiyasu Ito; Yasuhiro Mitsui, all of Aichi-ken, Japan

[73] Assignee: Aoyama Seisakusho Co., LTD, Nagoya, Japan

[21] Appl. No.: 09/348,418

[22] Filed: Jul. 7, 1999

[30] Foreign Application Priority Data

Jul. 7, 1998 [JP] Japan ................................ 10-191364

[51] Int. Cl.⁷ ............................ F16B 25/00; F16B 35/04
[52] U.S. Cl. ........................... 411/386; 411/412; 411/426
[58] Field of Search .................................. 411/386, 412, 411/413, 426

[56] References Cited

U.S. PATENT DOCUMENTS

| 5,863,167 | 1/1999 | Kaneko | 411/412 X |
| 5,882,162 | 3/1999 | Kaneko | 411/386 X |

FOREIGN PATENT DOCUMENTS

| 43329 | 2/1934 | France | 411/426 |
| 50-79861 | 7/1975 | Japan . | |
| 52-77371 | 6/1977 | Japan . | |
| 54-147364 | 10/1979 | Japan . | |
| 59-37413 | 3/1984 | Japan . | |
| 63-43737 | 2/1988 | Japan . | |
| 5-57415 | 7/1993 | Japan . | |
| 6-59619 | 8/1994 | Japan . | |

*Primary Examiner*—Neill Wilson
*Attorney, Agent, or Firm*—Dike, Bronstein, Roberts & Cushman, LLP; David G. Conlin; David A. Tucker

[57] ABSTRACT

Disclosed is a bolt which has been contemplated to solve problems of prior bolts and to provide the bolt adapted to corrects its own position in a precise direction to permit normal fastening without failure such as slipping, seizure or the like even when the bolt is inserted slantingly into a mating female screw. The bolt comprises a constant diameter columnar portion having a smaller diameter than that of a bolt shank portion and formed on an end portion of the bolt shank portion, formed with normal screw threads, in a direction of insertion with a short tapered portion therebetween, and complete screw threads formed on the constant diameter columnar portion to be equal in pitch and thread groove depth to the normal screw threads on the bolt shank portion.

4 Claims, 2 Drawing Sheets

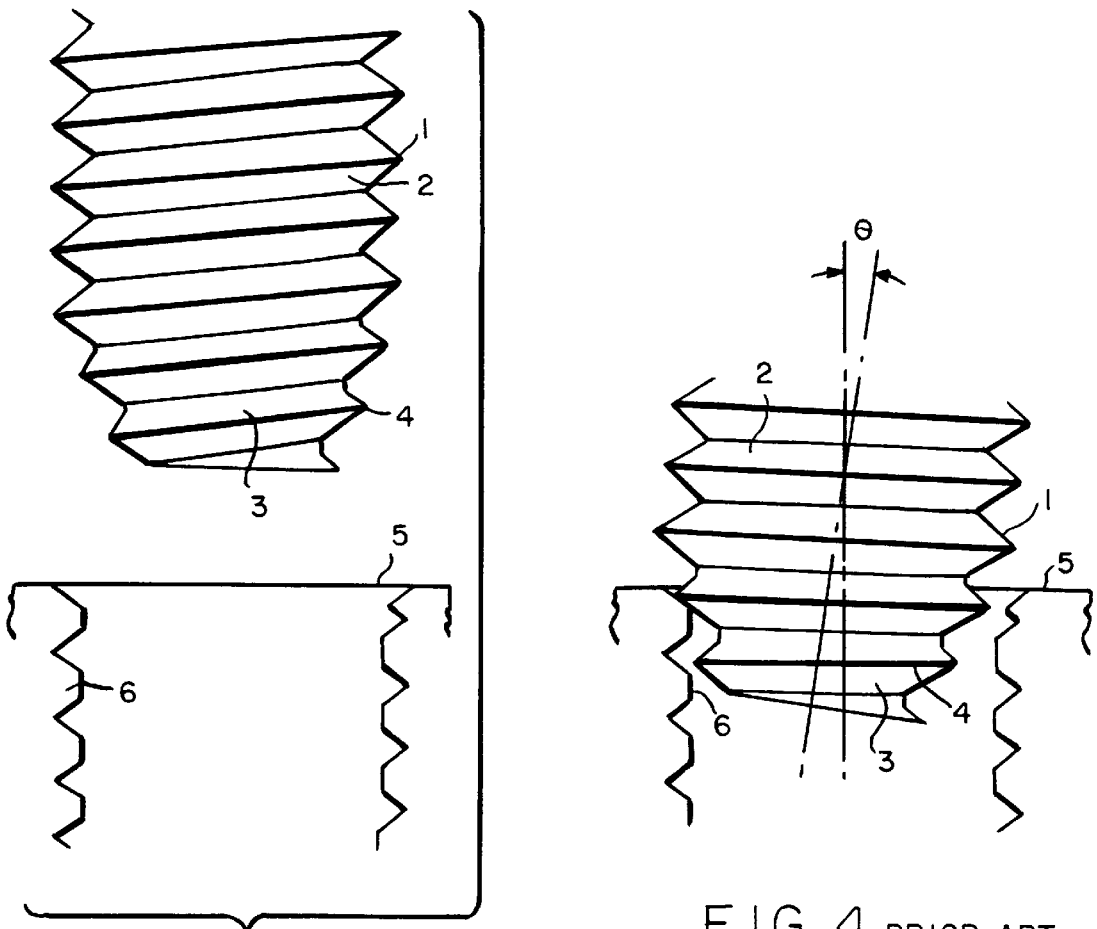
FIG. 3 PRIOR ART
FIG. 4 PRIOR ART
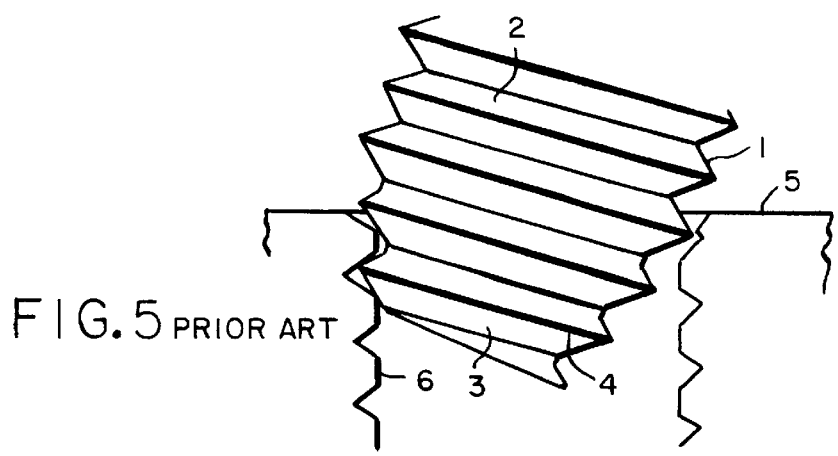
FIG. 5 PRIOR ART

SELF-ALIGNING BOLT

BACKGROUND OF THE INVENTION

The present invention relates to a bolt having an excellent guiding performance.

Bolts have been known which are provided at a tip end of a bolt shank portion with a guide portion so that, even when a bolt is inserted slantingly into a mating female screw, the bolt corrects its own position to be precisely inserted into the female screw (as disclosed in, for example, Japanese Provisional Utility Model Publications Nos. 5-57415, 59-37413, 54-147364, 6-59614, 52-77371 and 50-79861). FIG. 3 shows an example of prior bolts devised in that manner, in which a tapered portion 3 is provided on a tip end of a bolt shank portion 2 formed with normal screw threads 1 and screw threads 4 are also formed on the tapered portion.

It is believed that while the tapered portion 3 is sometimes formed to define a simply tapered slant face, it can be formed with the screw threads 4 whereby, even when an associated bolt is inserted somewhat slantingly into a mating female screw such as nuts or the like, the screw threads formed on the tapered portion engage with screw threads 6 of the female screw to enable guiding the bolt precisely relative to the female screw while correcting a position of the bolt.

However, it is not possible to form complete screw threads on the tapered portion 3, and so the screw threads 4 on such portion become necessarily incomplete. Such incomplete screw threads are made smaller in height than complete screw threads are. Therefore, when a slant angle $\theta$ (see FIG. 4. The same applies in the following description) of a central axis of the bolt relative to a central axis of a female screw 5 is small, the bolt can be corrected with respect to a direction of insertion, but when a slant angle $\theta$ is great, the screw threads on the tapered portion will not engage with the screw threads 6 on the female screw 5, and so undergo slipping to crush the screw threads on the female screw and to generate pitch jumping with the result that continued fastening causes a danger of seizure on the bolt.

Further, in the case where such bolts are fastened by means of an automatic fastening machine, not only the slant angle but also axial misalignment (misalignment between the bolt axis and the female screw axis) become problematic. Incidentally, an example of the user's demands is that the slant angle $\theta$ is at least 3 degrees with the axial misalignment being 3 mm.

SUMMARY OF THE INVENTION

The invention has been contemplated to solve the above-mentioned problems of prior bolts and to provide a bolt adapted to corrects its own position in a precise direction to permit normal fastening without failure such as slipping, seizure or the like even when the bolt is inserted slantingly into a mating female screw. Further, the invention has been contemplated to provide a bolt which can meet the demands of users in the case where automatic fastening machines are used.

To solve the above-mentioned problems, the bolt of the invention comprises a constant diameter columnar portion having a smaller diameter than that of a bolt shank portion and formed on an end portion of the bolt shank portion, formed with normal screw threads, in a direction of insertion with a short tapered portion therebetween, and complete screw threads formed on the constant diameter columnar portion to be equal in pitch and thread groove depth to the normal screw threads on the bolt shank portion. Preferably, an outer diameter (a diameter of an imaginary cylinder contacting with crests of screw threads) of the constant diameter columnar portion is substantially the same as a minimum value (an allowable minimum value prescribed by screw standards) of an inner diameter of a mating female screw. Also, the tapered portion has a length which corresponds to 1 to 1.5 pitches, and the constant diameter columnar portion has a length which corresponds to 1.5 to 5 pitches.

The bolt according to the invention comprises a constant diameter columnar portion formed on an end portion of a bolt shank portion in a direction of insertion, and complete screw threads formed on the constant diameter columnar portion to be equal in pitch and thread groove depth to the normal screw threads formed on the bolt shank portion, so that, even when the bolt is inserted slantingly into a mating female screw, the complete screw threads formed on the constant diameter columnar portion can catch screw threads of the female screw with certainty, and as the bolt is fastened into the mating female screw as it is, the bolt is naturally corrected in its position by its fastening force to be fitted correctly into the female screw along leads. Therefore, the bolt of the invention will not undergo fastening failure such as slipping, seizure or the like as with prior bolts of the same kind, and is free from crushing of screw threads of an associated female screw. The effect of positional correction of the present bolt exhibits itself even in the presence of more or less axial misalignment, and so it is possible to smoothly perform a fastening work making use of an automatic fastening machine.

BRIEF DESCRIPTION OF THE DRAWINGS

FIG. 3 is a partially cross sectional view showing an end portion of a prior bolt in the direction of insertion;

FIG. 4 is a partially cross sectional view showing a state, in which the prior bolt is inserted slantingly into a mating female screw; and FIG. 5 is a partially cross sectional view showing a condition of seizure of the prior bolt in the mating female screw.

DESCRIPTION OF THE PREFERRED EMBODIMENTS

Figures 1, 2:
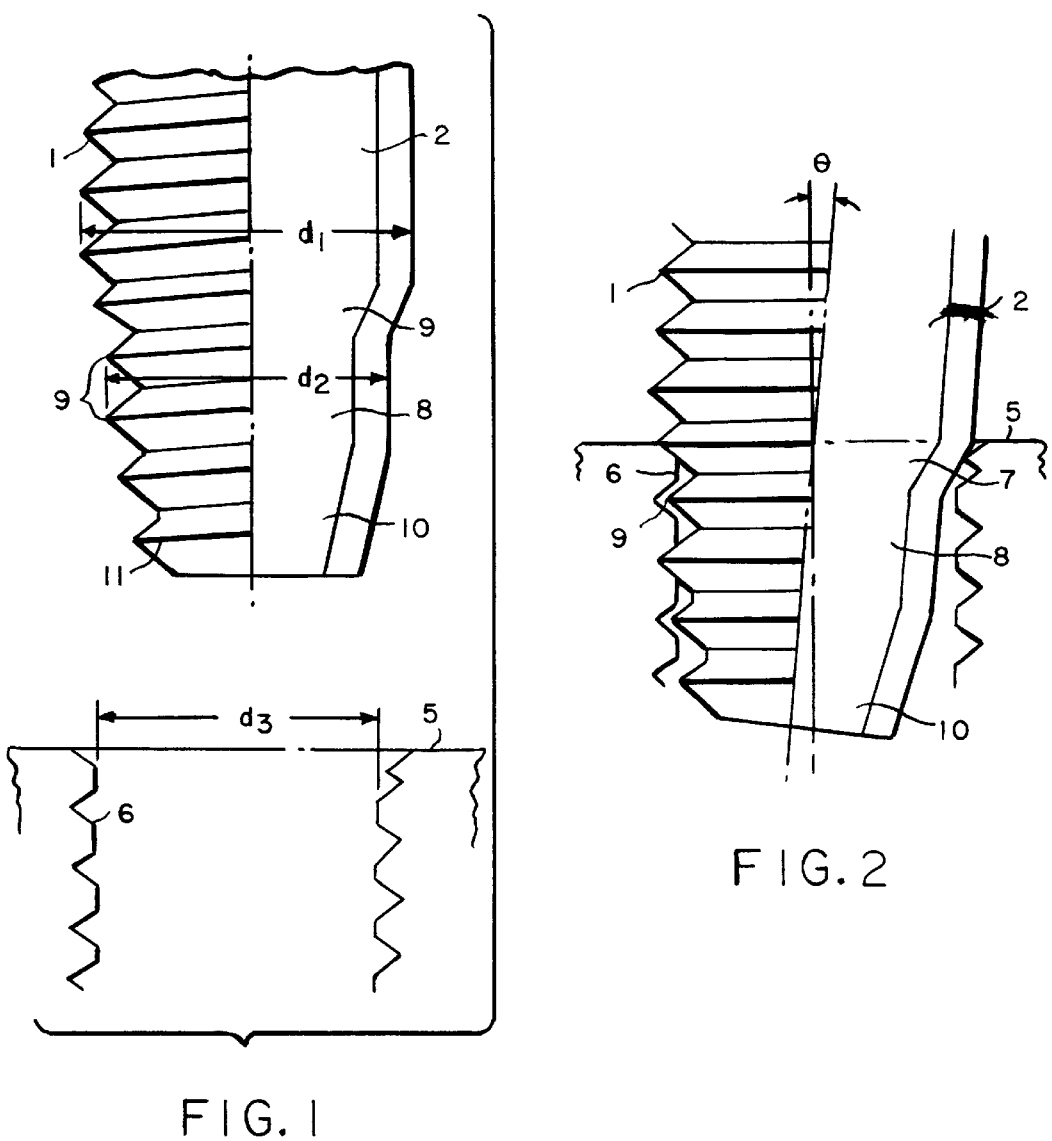
FIG. 1 is a partially cross sectional view showing an end portion of a bolt of the invention in a direction of insertion.
FIG. 2 is a partially cross sectional view showing a state, in which the bolt of the invention is inserted slantingly into a mating female screw.

The invention will be described in details with reference to the accompanying drawings, in which an embodiment of the invention is shown.

In FIG. 1, the reference numeral 2 designates a shank portion provided at a peripheral surface thereof with normal screw threads 1 as in conventional bolts. A constant diameter columnar portion 8 is formed on an end portion of the bolt shank portion 2 in a direction of insertion with a short tapered portion 7 therebetween. An outer diameter d2 of the constant diameter columnar portion 8 is smaller than an outer diameter d1 of the bolt shank portion 2, and preferably is substantially the same as a minimum value of an inner diameter d3 of a mating female screw 5. In addition, it is appropriate that the tapered portion 7 has a length which corresponds to 1 to 1.5 pitches (this corresponding length amounts to about 25 degrees in terms of angle).

The constant diameter columnar portion 8 is formed with complete screw threads 9. The complete screw threads 9 are equal in pitch and thread groove depth to the normal screw threads 1 on the bolt shank portion 2. As described above, the complete screw threads 9 serve to catch screw threads of the female screw with certainty when the bolt is inserted slantingly into the mating female screw 5 (see FIG. 2). If the number of the complete screw threads is too small, the bolt assimilates to conventional ones, so that it cannot exhibit its effect fully. Meanwhile, the complete screw threads do not contribute to the fastening function after the bolt is correctly fastened in the mating part, and so there is nothing to be gained by making the constant diameter columnar portion longer. Accordingly, it is preferable that the complete screw threads be formed in the extent of 1.5 to 5 pitches.

Preferably, a tapered tip end portion 10 is further formed on an end of the constant diameter columnar portion 8 in the direction of insertion. The tapered tip end portion 10 serves as a guide for insertion of the bolt into the mating female screw 5, but may be omitted. In the embodiment shown, the tapered tip end portion is formed with incomplete screw threads 11, but may be simply tapered without threads.

When the present bolt constructed in the aforementioned manner is inserted slantingly into the mating female screw 5, the constant diameter columnar portion 8 will abut against an inner surface of the female screw 5 as shown in FIG. 2, in which case it is possible to catch screw threads of the female screw 5 with certainty since screw threads formed on the constant diameter columnar portion 8 are the complete screw threads 9.

Accordingly, as the bolt is fastened into the mating female screw from a state shown in FIG. 2 as it is, a downward force is acted only on a lefthand portion (see FIG. 2) of the bolt, so that slant at the time of insertion of the bolt is corrected by the inserting motion of the bolt itself and so the bolt can be fitted correctly into the female screw along leads. Therefore, the bolt is prevented from slipping within the female screw 5 unlike conventional bolts, and so it is possible to prevent crushing of screw threads of the female screw 5. Further, seizure, which would be caused by fastening in a state of gearing at the time of bolt fastening, is prevented.

As described previously, the bolt according to the invention comprises a constant diameter columnar portion formed on an end portion of a bolt shank portion in a direction of insertion, and complete screw threads formed on the constant diameter columnar portion to be equal in pitch and thread groove depth to the normal screw threads formed on the bolt shank portion, whereby there is obtained an advantage that, when the bolt is inserted slantingly into the mating female screw, it is possible to catch screw threads of the female screw with certainty, thus preventing slipping and seizure, and correctly fitting the bolt into the female screw while correcting a position of the bolt. Further, the bolt according to the invention can be manufactured in the same manner as with prior bolts only by devising a configuration of rolling dies and without the need of any special manufacturing equipment.

What is claimed is:

1. A bolt comprising a constant diameter columnar portion having a smaller diameter than that of a bolt shank portion and formed on an end portion of the bolt shank portion, formed with normal screw threads, in a direction of insertion with a short tapered portion therebetween, and complete screw threads formed on the constant diameter columnar portion to be equal in pitch and thread groove depth to the normal screw threads on the bolt shank portion.

2. The bolt according to claim 1, wherein said diameter of said columnar portion is substantially the same as a minimum diameter of a female screw thread sized to mating engage said normal screw threads of said shank.

3. The bolt according to claim 1, wherein the tapered portion has a length which corresponds to 1 to 1.5 pitches, and the constant diameter columnar portion has a length which corresponds to 1.5 to 5 pitches.

4. The bolt according to claim 2, wherein the tapered portion has a length which corresponds to 1 to 1.5 pitches, and the constant diameter columnar portion has a length which corresponds to 1.5 to 5 pitches.

* * * * *